United States Patent [19]
dos Santos Costa

[11] Patent Number: 6,013,955
[45] Date of Patent: Jan. 11, 2000

[54] HYDROREACTOR TO TAKE ADVANTAGE OF THE KINETIC ENERGY FROM THE WATER IN PLACES WHERE THE STREAMS ARE MEANINGFUL FOR THE PRODUCTION ELECTRIC POWER

[75] Inventor: António José A. dos Santos Costa, Lourinhã, Portugal

[73] Assignee: A.G. da Cunha Ferreira, Lda., Lisbon, Portugal

[21] Appl. No.: 09/205,322

[22] Filed: Dec. 4, 1998

[30] Foreign Application Priority Data

Dec. 11, 1997 [PT] Portugal .................................. 102088

[51] Int. Cl.[7] .................................................. F03B 13/10
[52] U.S. Cl. ............................................... 290/54; 415/2.1
[58] Field of Search ................................ 290/42, 43, 53, 290/54; 415/2.1, 3.1, 4.1

[56] References Cited

U.S. PATENT DOCUMENTS

| | | | |
|---|---|---|---|
| 3,928,771 | 12/1975 | Straumsnes | 290/43 |
| 4,163,904 | 8/1979 | Skendrovic | 290/54 |
| 4,218,175 | 8/1980 | Carpenter | 415/2 |
| 4,781,523 | 11/1988 | Aylor | 415/2 A |
| 4,868,408 | 9/1989 | Hesh | 290/52 |
| 5,798,572 | 8/1998 | Lehoczky | 290/54 |

*Primary Examiner*—N. Ponomarenko
*Attorney, Agent, or Firm*—Fenwick & West

[57] ABSTRACT

This invention concerns to an axial flow turbine referred as to an hydroreactor, to take advantage of the kinetic energy from the water in relative depth places in rivers, estuaries or inlets, where the water streams are meaningful for the production of electric power. It is comprised by a conduit (1), inside which the water flows, a turbine impeller (2), a conduit support for said conduit (1), a rudder (17), a balancing weight (18), a bearing pedestal (22), a generator (8), coupled to said turbine impeller (2) by means of a transmission device (5, 6), a gearbox (7) and a centrifugal clutch, being the said turbine impeller (2) placed inside the said conduit (1) in which the water flows, the conduit support is comprised by a fixed part (15) well fitted over said bearing pedestal (22) solidary with four or more equally spaced hydraulic jacks (20) to lift the structure for maintenance proposes or depth control, and a mobile part (16), having a main body (16') which supports directly the conduit (1), a rudder (17) to drive the mobile part (16) according to the stream direction, and a balancing weight (18) to match the centre of mass of the mobile structure with the axis of the bearing pedestal (22), which together, define a system of supported immersed conduit for taking advantage of the stream, with a special shape, that will promote compression at entry side and suction effect by depression at exit side, easing the water flow through said conduit (1), the velocity through the impeller (2) being higher than the velocity of the outside stream before the conduit entrance (10), with autonomous rotation making it usable not only in rivers but also in estuaries or inlets, where the stream direction changes due to the tidal effect.

44 Claims, 11 Drawing Sheets

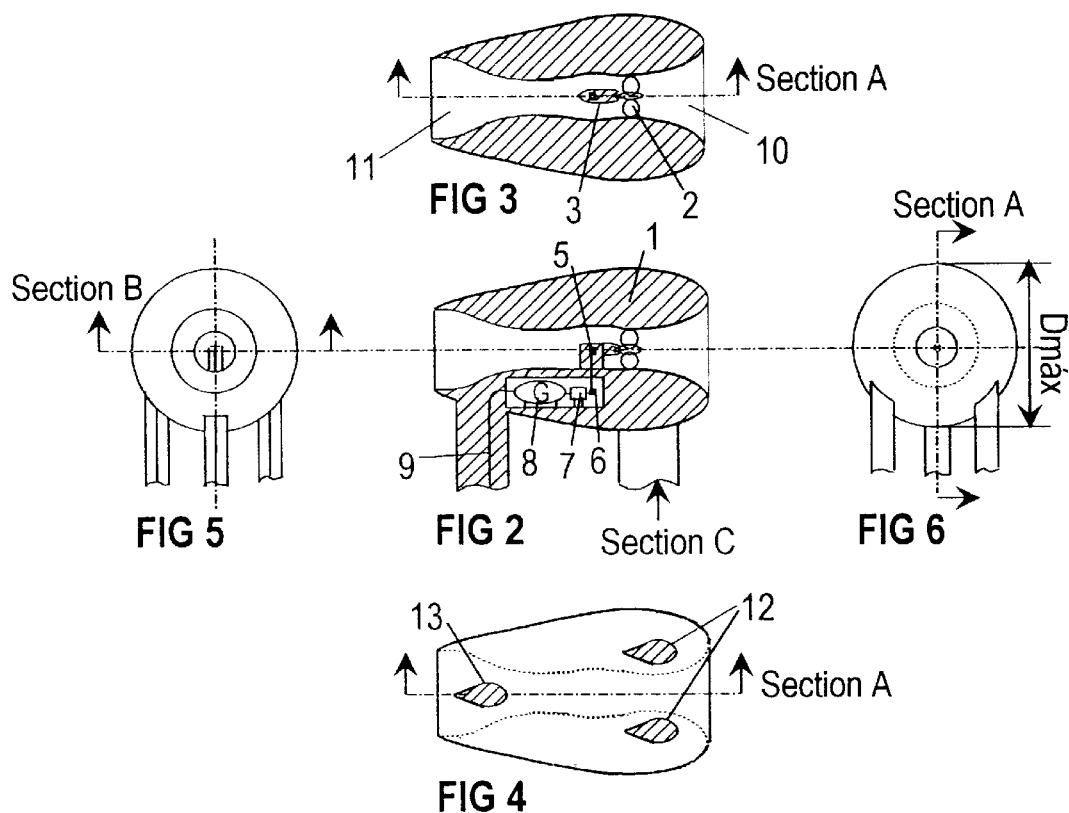

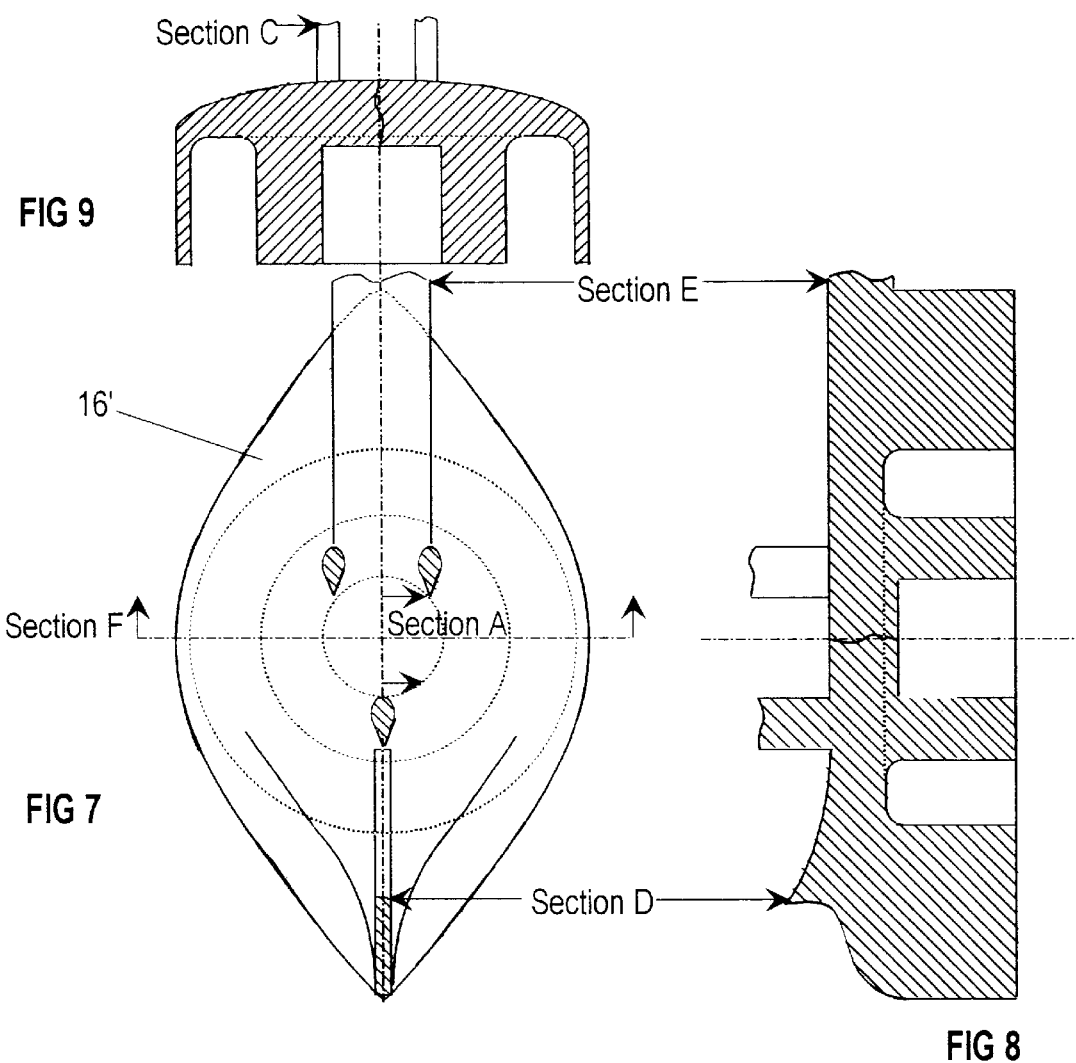

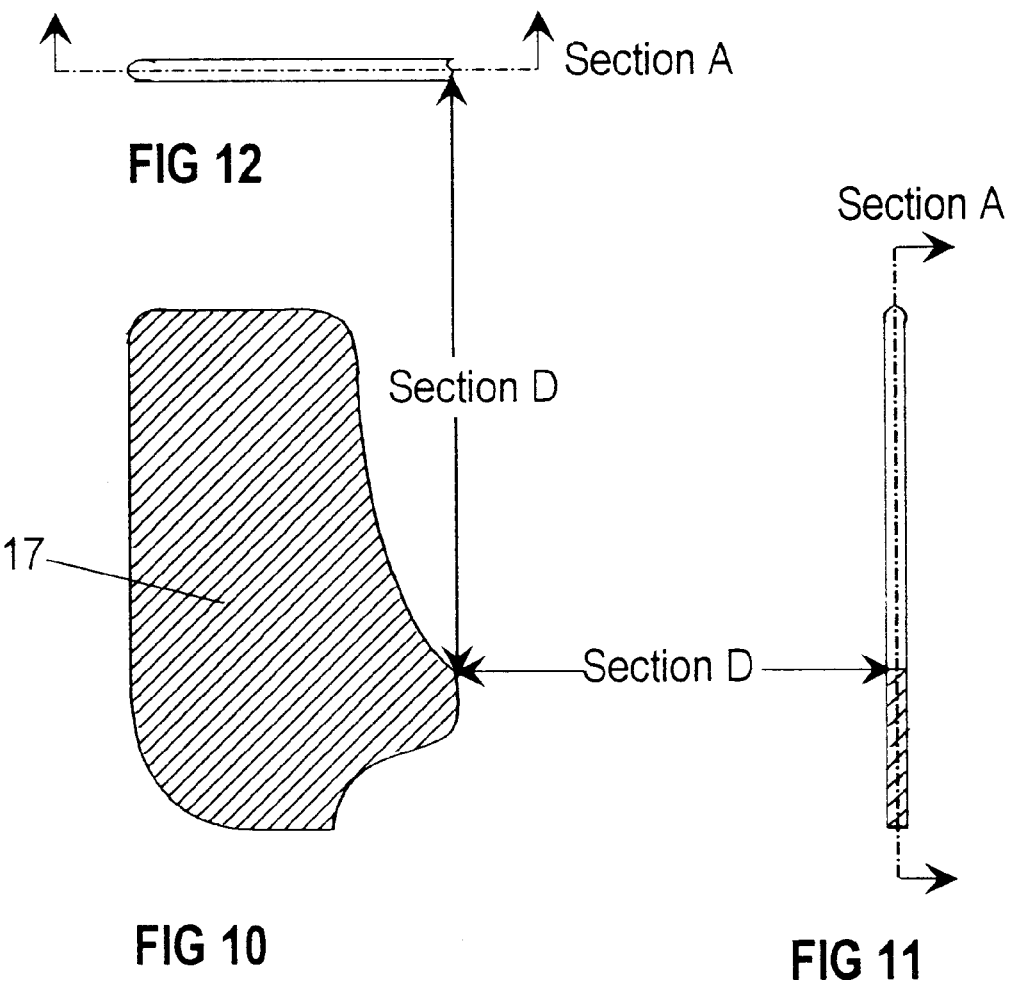

Section A

Section E  18

← Section E

Section A

HYDROREACTOR TO TAKE ADVANTAGE OF THE KINETIC ENERGY FROM THE WATER IN PLACES WHERE THE STREAMS ARE MEANINGFUL FOR THE PRODUCTION ELECTRIC POWER

TECHNICAL FIELD

The present invention refers to an hydraulic turbine of axial flow, designated from now on by hydroreactor, intended to take advantage of the kinetic energy from the water in places with relative depth in rivers, estuaries or inlets where the streams are meaningful for the production of electric power.

THE STATE OF THE ART

Within the known systems for taking advantage of hydraulic resources, using turbines are considered the closest prior art the ones disclosed in PCT patent application PCT/HU90/00072 (WO 91/07587) and PCT/CA91/00066 (WO 92/15782).

PCT/HU90/00072 (WO 91/07587) discloses a "Water current energy converter" designed for and capable of converting the flow energy of a moving body of water into electric power comprises, at least one water driven flow machine, especially a water driven turbine, an electric power generator and an energy transfer system arranged between the water turbine(s) and the power generator. According to the invention in at least one thoroughfare flow duct of a floating buoyant body at least one pumping unit comprising an hydraulic rotary pump coupled to a shaft of the water driven turbine is provided. The buoyant body is held by anchoring means in predetermined orientation and in substantially stationary position in a surface water. The hydraulic rotary pumps form component parts and serve hydraulic pressure sources in the hydraulic energy transfer system.

PCT/CA91/00066 (WO 92/15782) discloses an "Apparatus for recovering kinetic energy in a free flowing water stream" designed for converting the water stream into useful energy, it comprises a body immerged in a stream, the body defining a duct having an intake side and a discharge side. The discharge side is equipped with a deflector which flares outwardly for obstructing the flow of water around the duct to thereby create a negative pressure drag on the water being impelled as it is being discharged from the duct. The deflectors flare outwardly at an angle varying from 75° to 160° as measured from the longitudinal axis of the duct.

THE INVENTION

The object of the present invention is to provide an hydroreactor, which is designed to be used for production of electric power, not only in rivers but also in estuaries or inlets where the streams change their direction according to the sea tides action. It consists of a rotating system of sustained immersed conduit for taking advantage from the water streams.

The conduit having a special shape that will promote a suction effect, easing the flow of water through its interior in which is placed the turbine impeller through which the velocity is higher, with a specific relation, than the velocity of the stream at the outside before the conduit entrance. The object of the invention is designed to present an hydrodynamic shape allowing easier water ripping and minimising non wanted turbulence. The locals chosen for its implantation should be enough depth to assure the immersion of the structure.

The object of the invention differs from the mentioned patent application publication number WO 91/07587 in that:
i) is a well fitted sustained immersed conduit having a special shape (to be described later);
ii) the support allows robust attachment of the conduit to the depth bottom;
iii) it is an autonomous rotating system which can be used for taking advantage from water streams not only in rivers but also in estuaries and inlets, where the stream direction changes.

The object of the invention differs from the mentioned patent application publication number WO 92/15782 in that:
i) the conduit format is such that the flow inside it is axial from the entry to the exit sections, the velocity through the turbine impeller being higher, with a specific relation, than the stream velocity outside of the conduit;
ii) it is an autonomous rotating system which can be used for taking advantage from water streams not only in rivers but also in estuaries and inlets, where the stream direction changes.

BRIEF DESCRIPTION OF THE DRAWINGS

The invention may be better understood by making reference to the following description taken together with the accompanying drawings, in which:

FIGS. 2 to 6 show several sectional elevation views of the conduit;

FIGS. 7 to 9 show several sectional elevation views of the main body of the support mobile part;

FIGS. 10 to 12 show several sectional elevation views of the rudder;

EMBODIMENTS

Figure 1:
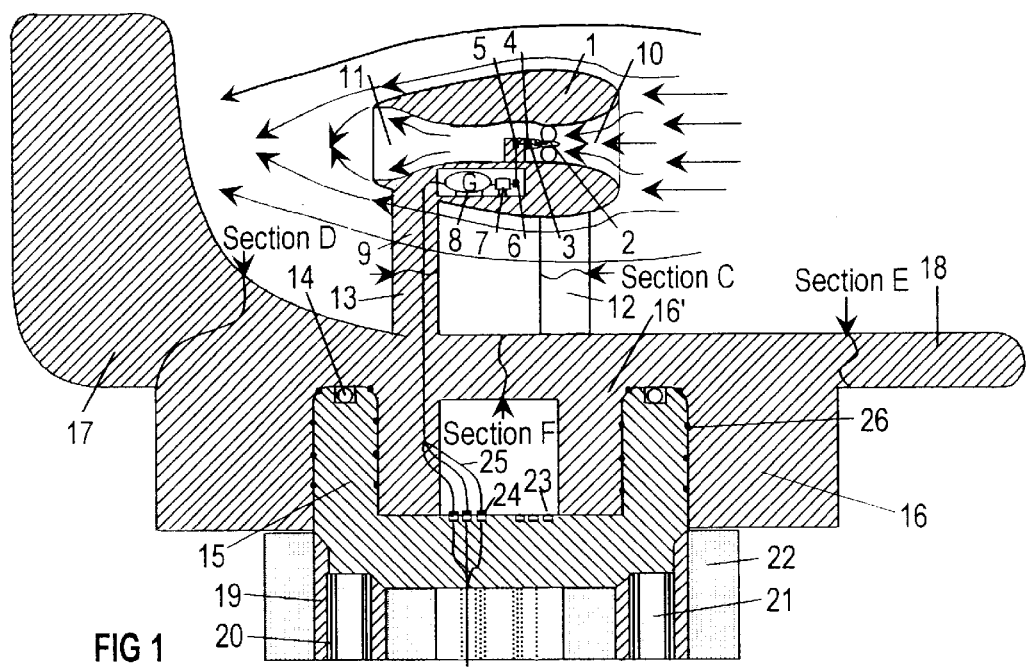
FIG. 1 gives a general overview of the hydroreactor structure through a longitudinal section A, symmetrical to a plane defined by the conduit axis and the bearing pedestal axis.

Referring to FIGS. 1 to 21, the section B is defined according to a plane perpendicular to the section A, intercepting this section by the axis of the conduit 1, section C is defined according to a plane parallel to section B, intersecting half length the connecting rods 12 and 13, which connect the conduit 1 to the main body 16' of the support mobile part 16, section D intersecting the rudder 17 according to a line next to and following the contour of the main body 16' of the support mobile part 16, section E intersecting transversely the balancing weight 18 next to the rounded front edge of the main body 16' of the support mobile part 16 and section F following a plane perpendicular to the planes A, B and C extending through the centre between the two connecting rods 12 closer to the conduit entrance section and the rod 13 closer to the conduit exit section.

Referring particularly to FIG. 1 the hidroreactor is comprised by a conduit 1 inside which the water flows where is placed the turbine impeller 2, a support for the conduit 1 comprised by a fixed part 15 well fitted over the bearing pedestal 22, solidary with four or more equally spaced hydraulic jacks 20 to lift the structure, for maintenance proposes and depth control, and a mobile part 16, having a main body 16' which supports directly the conduit 1, a rudder 17 to drive the structure according to the stream direction, and a balancing weight 18, whose propose is to match the centre of mass of the structure mobile part 16 with the axis of the bearing pedestal 22.

Referring more particularly to FIGS. 2 to 6 the external surface of the conduit 1 is defined by circular transversal sections along it and the conduit external diameter varies slightly from its maximum diameter section, where the turbine impeller 2 is located, to its exit section, such as the angle ϵ defined between the axis of the conduit 1 and the line which approaches by linear regression to its external surface variation in this area, should not be higher than 10 degrees, in order to avoid as much as possible turbulence nearby this surface caused by the cavitation effect due to the water flow action. The internal shape of the conduit 1 is defined by an area corresponding to the entrance of the conduit 1, where its internal diameter decreases, from the entry section to the location point of the turbine impeller 2, called entrance chamber 10, an internal area of constant diameter in which are located the turbine impeller 2 and its support 3 and by an area corresponding to the exit of the conduit 1, from which the internal diameter increases until the exit section, called vacuum chamber 11. The vacuum chamber 11 is defined by an area of smaller diameter, just after the internal area of constant diameter, with a slighter internal diameter variation of the conduit 1, an intermediate area with a maximum variation and finally an area close to the exit section in which the variation is almost null.

The external diameter of the conduit 1, in the area of the entrance chamber 10, increases with a slope symmetrical to the decrease of the internal diameter to the location point of the turbine impeller 2, defining edges in this area that present in the sections A or B a symmetrical geometry according to a semi-elliptical shape, as to have a smoother and easier water ripping. The ratio between the entrance section diameter and the internal diameter of the conduit 1 at the location of the turbine impeller 2, is between 2 and 3, in order to be noticeable the difference between the stream velocity and the velocity of the water flowing through the turbine impeller 2 and on the other hand to avoid water from blocking the conduit entrance caused by an abrupt increase of pressure due to an exaggerate funnelling of the conduit entrance chamber 10. The external diameter decreases slightly from the turbine impeller 2 location point to the exit section, in order to avoid the build-up of turbulence close to the external surface in this area, by the cavitation effect due to the stream action. As it will be proved later in the description, the angle ϵ defined between the axis of the conduit 1 and the line which approaches by linear regression to its external surface variation in this area, is not higher than 10 degrees.

The impeller support 3 should present an inverted L shape, being as much thin as possible but large enough to enclose and allow the shielding of the shaft, associated bearings, pinions 5 and 6 and drive chain, with a limb (vertical portion of the inverted L) that ends in a rear sharp edge in order to minimise the turbulence and present a front edge surface in semi-elliptic shape for water ripping. The transmission ratio between the two first pinions, 5 and 6, is 1, in order to minimise the diameter of the drive pinion 5 and with that the thickness of the turbine impeller support 3 in its location area, the transmission conversion between the pinion 6 and the asynchronous generator 8 being made through the gearbox 7 and the centrifugal clutch. The distance, inside the constant diameter area, from the sharp edge of the impeller support 3 until the vacuum chamber 11, is approximately equal or slightly higher than the overall length of the turbine impeller 2 with its support 3, in order to attenuate completely the turbulence generated in the vacuum chamber 11, avoiding its extension to the edge of the impeller support 3 and on the other hand to generate a vacuum that compensates the charge losses inside the referenced area.

At the edge of the conduit 1 below the impeller support 3, is a room for housing an asynchronous generator 8, a centrifugal clutch and one gearbox 7, to which the access should be done by a masked door that guaranties reliable isolation from exterior when closed.

The conduit 1 is linked to the main body 16' of the mobile part 16, by three connecting rods, two of them 12 being closer to the entrance section, equally spaced from this section and from de plane of section A, and a connecting rod 13 closer to the exit section symmetric to section A, defined by a semi-elliptical frontal edge for water ripping and ending in a sharp edge in order to minimise the turbulence, of enough length to allow the free flow of water between these two parts. The option for three connecting rods and not for only one according to the pedestal axis or two according to the plane of section A, one closer to the entrance section and another closer to the exit section, will guarantee more stability.

The rudder 17, represented on FIGS. 10 to 12, is symmetrical to section A, and is linked to the main body 16' of the support mobile part 16, having enough area to easily transpose the inertia momentum of the mobile part of the structure, but not too large, and being placed sufficiently far away from the conduit 1 exit section in order to minimise the influence of the turbulence at the conduit 1 outlet in the stability of the mobile part of the structure.

Figure 14:
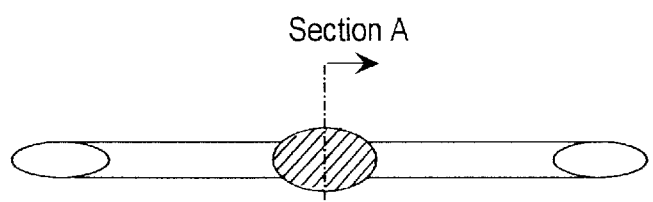
FIGS. 13 to 15 show several sectional elevation views of the balancing weight.
Figure 15:
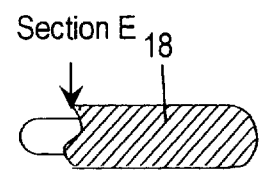
Figure 13:
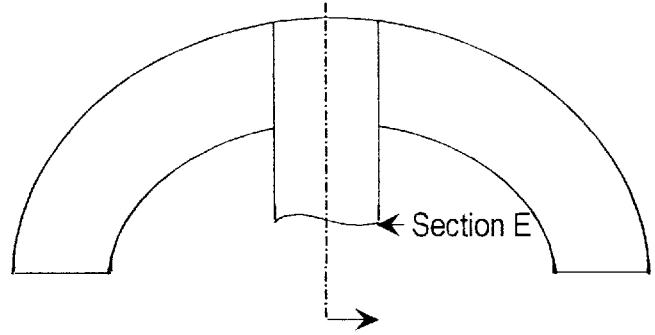

The balancing weight 18, represented on FIGS. 13 to 15, is symmetrical to the plane of section A, being linked by a connecting rod to the main body 16' of the mobile part 16, forms a semi-arch defined by an elliptic section not to large in order to make it inert to the waving effects and of narrow thickness for relatively easier water ripping, and with a mass that makes the mobile structure centre of mass to match with the axis of the bearing pedestal 22.

According to FIGS. 7 to 9, the external surface of the main body 16' of the support mobile part 16, is symmetrical to the rudder 17 direction, defining a round edge in the opposite side to the rudder 17 for easier water ripping and ending in a sharp edge at the rudder 17 side in order to minimise the turbulence. It contains a cavity defined between two cylindrical surfaces of different diameter centered on the axis of the bearing pedestal 22, that fits in the support fixed part 15, and one internal cavity with a cylindrical format centered on the axis of the bearing pedestal 22, properly isolated from the outside, for avoiding any humidity from entering.

Figure 16:
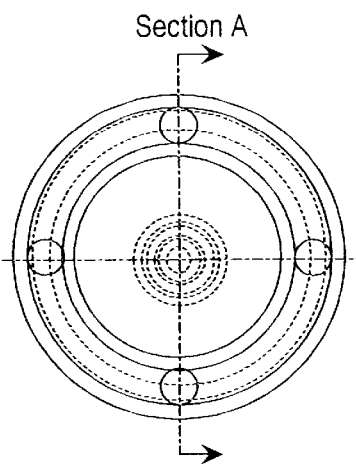
FIGS. 16 to 18 show several sectional elevation views of the support fixed part
Figure 17:
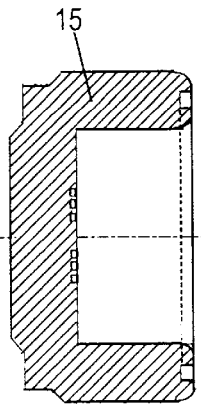
Figure 18:
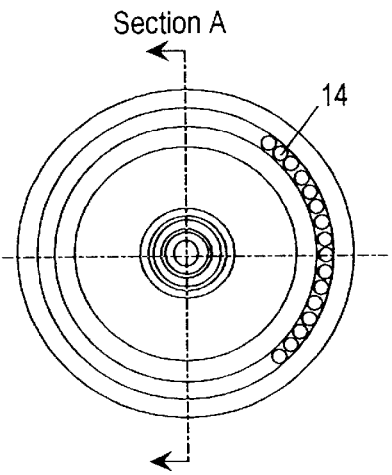
Figure 19:
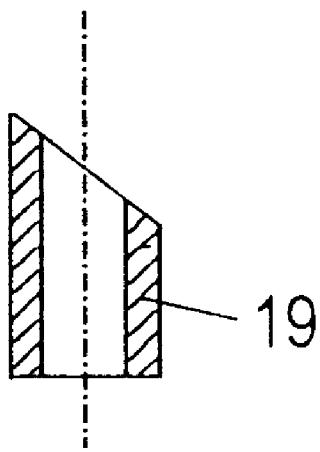
FIGS. 19 to 21 show several sectional elevation views of metallic cylindrical jackets for protection and adjustment proposes of the hydraulic jack tubes.
Figure 20:
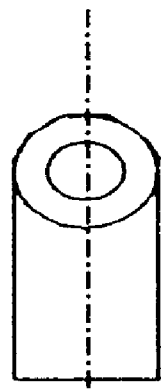
Figure 21:
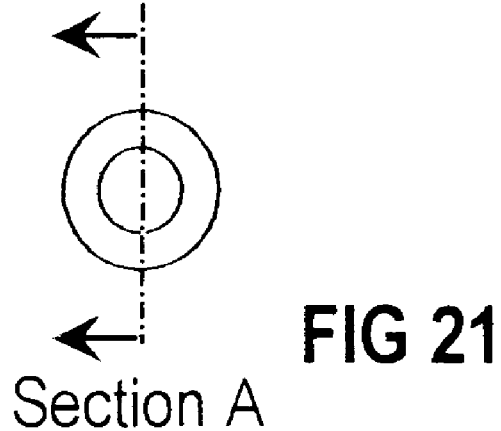

The support fixed part 15, represented on FIGS. 16 to 18, have a circular edge defined by the space between two cylindrical surfaces of different diameter both centered by the axis of the bearing pedestal 22, which fits adjusted in the external cavity of the support mobile part 16. On the top of the edge exists a giant ball bearing 14 in order minimise the friction between the support fixed part 15 and the mobile part 16. The top of the edge has external round shaped corners. At the area inside the edge there are on the floor a specific number of circular rails (according to the number electric phases), lined with an highly isolating material, where is established the contact between conducting metal brushes 24, constituting the ends of the cables (9) at the mobile part, and conducting metal rings 23, constituting the ends of the cables 9 at the fixed part. Several rotary rubber seals 26 should exist on the surface of contact between the support fixed and mobile parts to assure an isolation of extreme reliability that makes impossibly the entrance of any humidity to the area where the electric contacts are established. The lower surface of the support fixed part 15 which bears on the bearing pedestal 22, should present a bevel of conical shape that fits in an adjusted way in the cavity of the bearing pedestal 22. The support fixed part 15 is solidary with four or more equally spaced hydraulic jacks 21, whose function is to lift the structure emerging it for handling proposes or depth control. The internal face of the cavity edges of the bearing pedestal 22 defines an obtuse angle between 120° and 135°, to present higher strength not being so prone for rupturing caused by the stream traction effect as in the case if it presents a rectangular internal corner. The cavity surface of the bearing pedestal 22 is lined with a metal film, in order to avoid the direct contact between the support fixed part 15 with the cement of the bearing pedestal 22. There are holes in the bearing pedestal 22 dressed with metallic cylindrical jackets 19 for protection and adjustment proposes where fit the hydraulic jacks pipe tubes 20.

Figure 22:
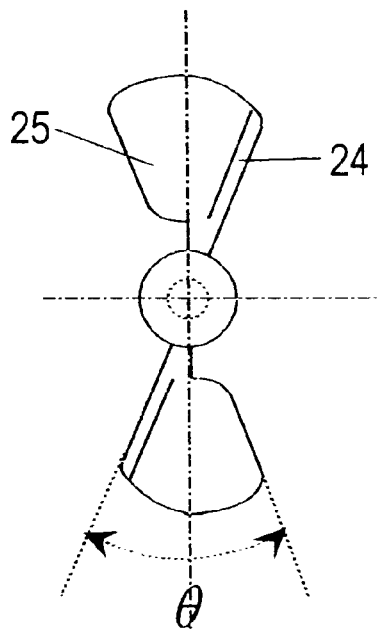
FIGS. 22 to 24 show several elevation views of the turbine impeller 2.
Figure 23:
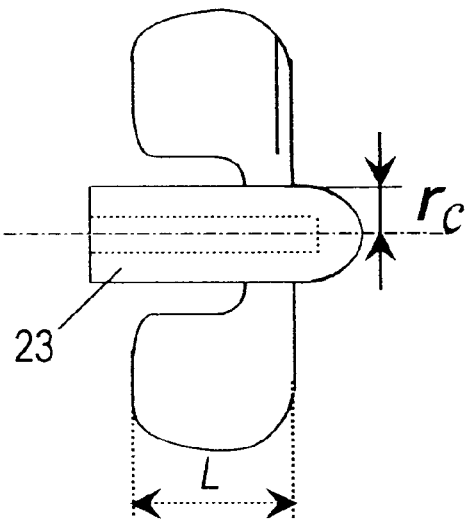
Figure 24:
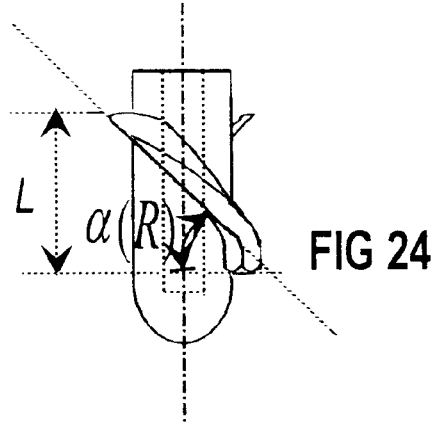

The turbine impeller 2 shown in FIGS. 22 to 24, in which there are only represented two of all the blades 25 in order to simplify the figures and with this to ease their understanding. The impeller blades 25 should not overlap, being defined by a small interval of free space between the projections of adjacent blades delimitation lines over a plane perpendicular to the propeller axis, to ease the water flow through it, being a non exaggerated interval in order not to imply a significant lose of power. The turbine impeller 2 should have between 6 and 8 blades 25, in order not to have very broad blades 25 offering a great resistance to the water flow and not to have very narrow blades 25 implying a significant lose of power. According to this, the angle θ between the projections of the extremities of each blade 25 over a plane perpendicular to the impeller axis should be slightly lower than the ratio between 360° and the number of blades. The projections of the impeller blade 25 over their bisecting plane on θ, should be defined by a constant length L independently to the considered distance r from the axis of the turbine impeller 2. Once the linear velocity of a specific point on a blade, depends to its distance r from the axis, decreasing with r, the incidence angle of the blades into water, is a function of r that should be done by the following expression:

$$\alpha(r) = \operatorname{arctg}\left[\frac{L}{2r\sin(\theta/2)}\right] \quad (1)$$

The incidence angle of the blades 25 into water on the periphery points α(R), where R is the turbine impeller 2 radius, is not lower than 45° in order to guarantee a specific impeller rotation frequency $F_{HT}$ not offering a great resistance to the water flow through it. The blade incidence edge into water is defined by an half-round 24 of round format, in order to ease the incidence and with this its reaction to the flow. The impeller hub 23, has a round format frontal part in order to ease water ripping. The blades 25 are linked to the hub 23 only by a thin rod in the contiguity of the half-round 24 incidence edge, resulting in an aperture around the impeller hub 23, close to which the blades 25 present an higher incidence angle, easing the turbine impeller 2 reaction to the water flow. The lower edge of the blades 25, where they present an higher incidence angle, is almost all rectilinear in order to optimise the drag on and the turbine impeller 2 reaction to water flow rate, and terminates according to a curve line format in the liberation area and in the periphery area (farthest area from the turbine impeller 2 axis) in order to minimise turbulence and to ease the reaction to water flow. The hub 23 diameter is equal to the diameter of the horizontal limb of the impeller support 3, having two elements with contiguous surfaces in order to minimise water flow irregularities.

On practice the stream velocity $V_c$ and so the turbine impeller 2 rotation frequency $F_{HT}$ vary. For this reason it is proposed for electric power production the use of an asynchronous generator 8 with the rotor coils short-circuited (it may be adopted a squirrel cage type rotor), operating on an auto-excited generator operating state (this is, with compensation of the active and reactive components of the generated electrical current). This generating state is attained when the shaft rotation frequency is higher than the frequency of the stator electrical rotating field resulting from the phase shifting of individual stator coil electrical fields (which corresponds to the oscillation frequency of electric fields on electricity mains $F_E$=50 Hz or 60 Hz), this in the case of one pole per coil machines, and higher than $F_E/N_P$ in the generic case of machines with $N_P$ poles per coil. It is usual to find asynchronous machines with 2, 3 or even 4 poles per coil.

Figure 25:
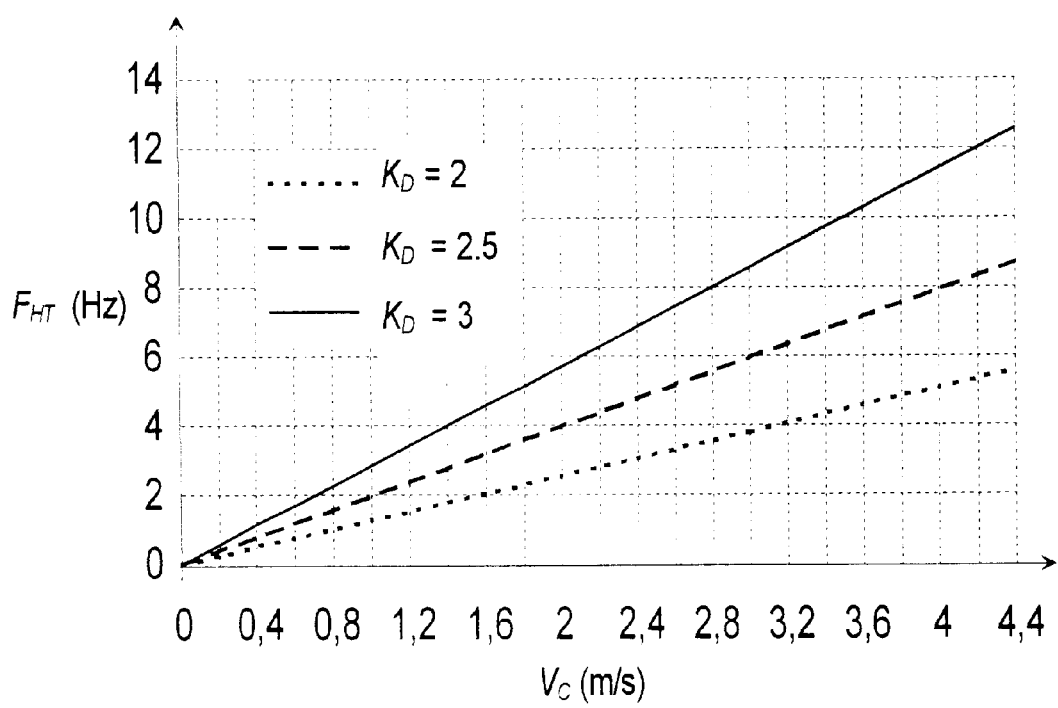
FIG. 25 shows a graphic representing the ideally turbine propeller rotation against the stream velocity.

From graphic of FIG. 25, it can be verified that the turbine impeller 2 rotation frequency $F_{HT}$ will be much lower than the relation $F_E/N_P$. It will then be necessary a gearbox 7, which imposes a specific transmission relation between the shaft of the turbine impeller 2 and the shaft of the asynchronous generator 8. There is an electromechanical system that connects the stator coils to the electricity mains only when the product $F_{HT}.N_{CV}$ (where $N_{CV}$ represents the gearbox 7 multiplication factor) be higher than the ratio $F_E,N_P$, disconnecting them when $F_{HT}.N_{CV} \leq F_E IN_P$ (operating state as a motor). The connection of the shaft of the turbine impeller 2 to the shaft of the asynchronous generator 8 by means of a centrifugal clutch, should be performed just after the shaft of the asynchronous generator 8 reach the angular velocity of synchronism $\Omega_S = F_E IN_P$, allowing so a soft drag on traction effect with the help of the electrical power from the electricity mains, becoming the turbine impeller 2 free whenever the stream velocity will not be enough to provide electric power to the electricity mains. For this propose, the connection of the stator coils to the electricity mains is performed in such a way that the rotor direction of rotation matches with the direction of rotation of the turbine impeller 2.

In the case of a three phase system, the compensation of the reactive component of the generated electrical current, can be done with an arrangement of capacitors in a star configuration with a capacity given by:

$$C = \frac{1}{\omega_E^2 \cdot L_{EE}} \quad (2)$$

where $L_{EE}$ represents the auto-induction coefficient of the stator coils. The compensation of the active component from the generated electrical current can be done with an arrangement of varying resistors (potentiometers) in a star configuration, whose value varies in accordance to the effective value of active component of the generated electrical current $[I_E]_{eff}$ according to:

$$R = \frac{[U_E]_{eff}}{[I_E]_{eff}} \quad (3)$$

where $[U_E]_{eff}$ represents the effective value of the voltage tensions between adjacent phases on the electricity distribution network. As the $[I_E]_{eff}$ values depend from the sliding factor S and hence from angular velocity $\Omega$ of the asynchronous generator 8 shaft, the resistor values are controlled as a function of $\Omega$.

The monitoring of the equipment conditions (rotary rubber seals, etc.) and the obtaining of data relative to its operation can be performed remotely on the land field with the help of a telesurveillance system.

All cables 9 should pass through the interior of under grounded pipes below the river, estuary or inlet bedstead.

Performance Analysis

Water presents very low kinetic viscosity v characteristic values (of the order of $10^{-6}$ m$^2\cdot$s$^{-1}$), resulting so in a very high number of Reynolds (relation between the kinetic strength associated to the water motion and the viscous strength associated with the inter-molecular links of the water), which means an almost non existent surface boundary layer (film by definition formed close to a plan surface, in a real fluid sliding over it, where there is a non uniform distribution of water velocities due to the molecular diffusion caused by friction tensions on the surface) on a flow over a polished plan surface, and by this reason may be considered as an almost perfect fluid.

Considering the conduit edges and turbine impeller 2 characterised by having polished surfaces (for example with plastic fibre coating) and the flow rate through the turbine impeller 2 substantially equal to the flow rate at the conduit entrance, the ratio between the velocity $V_{HT}$ by which water transverses the turbine impeller 2 and the stream velocity $V_C$ is inversely proportional to the relation between the conduit entrance section $S_E$ and the conduit internal section at the turbine impeller 2 location $S_{HT}$.

$$V_{HT} = \left(\frac{S_E}{S_{HT}}\right) \cdot V_C = \left(\frac{d_E}{d_{HT}}\right)^2 \cdot V_C = K_D^2 \cdot V_C \quad (4)$$

Where $d_{HT}$ is the diameter of the conduit 1 internal section at the turbine impeller 2 location and $d_E$ the conduit 1 entrance section diameter. According to claim 10, the conduit 1 edge is symmetrical at the entrance chamber area, the maximum diameter of the conduit exterior surface $d_{Max}$ can be expressed as a function of $d_E$ and $d_{HT}$ by the following equation:

$$d_{Max} = 2(d_E - d_{HT}) + d_{HT} \quad (5)$$

The inertia strength $F_A$ associated with the area A of a fluid in motion with a constant velocity $V_C$ (considering the plane of area A perpendicular to the fluid motion direction), is given by the following expression:

$$F_A[\text{kgf}] = \rho[\text{kg} \cdot m^{-3}] \cdot V_C^2[m^2 \cdot s^{-2}] \cdot A[m^2] \quad (6)$$

where $\rho$ represents the fluid density (about 1000 kg·m$^{-3}$ for the water).

According to this, the exercised pressure or linear tension T is given by:

$$T[\text{kgf} \cdot m^{-2}] = \rho[\text{kg} \cdot m^{-3}] \cdot V_C^2[m^2 \cdot s^{-2}] \quad (7)$$

Being this one applied on the maximum diameter conduit 1 exterior section, it is decomposed in two components, one consisting on its projection over the exterior surface of the conduit 1 between the maximum diameter exterior section and the exit section, with an amplitude given by $T.\cos(\epsilon)$ (representing $\epsilon$ the angle between the conduit 1 axis and the line that approximates by linear regression the conduit 1 exterior surface variation in the considered area) and with the same orientation as the stream and an other component with an amplitude given by $T.\sin(\epsilon)$ with a direction perpendicular to the considered surface and oriented from the interior to the exterior of the conduit. In order to not generate a cavitation effect nearby the upper part of the conduit 1 exterior surface, the projection of the second component on the vertical direction should be lower than the relative pressure $P_{Rel}$ of the water at the depth by which is the upper part of the conduit 1 exterior surface (the relative pressure of the water at a N×1 m depth is about N×1000 kgf·m$^{-2}$). The absolute pressure $P_{Abs}$ at a specific depth, is given by the sum of the atmospheric pressure $P_{Atm}$ at the water surface with the relative pressure of the water at that specific depth. If the projection of the second component on the vertical direction be higher than the relative pressure of the water, the pressure nearby the upper part of the conduit 1 exterior surface becomes approximately equal to the atmospheric pressure (1 atm=10330 kgf·m$^{-2}$), which is usually designed by cavitation effect. Thus, in order to avoid this effect the following relation must be verified:

$$T \cdot \sin(\varepsilon) \cdot \cos(\varepsilon) = \frac{T}{2} \cdot \sin(2\varepsilon) < P_{Rel} \quad (8)$$

It must be noted that due the pressure increase with the increase of the depth and to the friction on the bedstead, the verified stream intensity decreases with the depth and consequently the tracking tensions. Due to this fact, the upper part of the exterior of the surface conduit 1 (at a lower depth) is maintained at depths close to the water surface (about 0.5 m to 1.5 m depth from the water surface), and so the structure high should be regulated by an automatic system that controls the hydraulic jacks high according to the evolution of the water surface levels.

Basing on expressions 7 and 8 and considering the conduit upper surface at 1 m depth, maximum admissible values for angle $\epsilon$ of about 6° and 9° result, above whom the cavitation effect can be verified, considering as maximum values for the stream velocity respectively 3 m·s$^{-1}$ and 2.5 m·s$^{-1}$. It must be noted that as the depth increases, the maximum admissible value for $\epsilon$ increases, considering as reference the same value of maximum stream velocity limit above which would occur the cavitation effect. According to these results and pretending, the carry of a maximum stream velocity limit of about 2.5 m·s$^{-1}$ at 1 m depth without the occurrence of the cavitation effect nearby the upper part of the conduit 1 exterior surface, it is established a maximum limit for $\epsilon$ of 10° on the 3$^{rd}$ claim.

The linear velocity of rotation $V_{Rot}$ (r) of a specific point on a blade 25, is a function of the distance r to the turbine impeller 2 symmetry axis. As previously mentioned, the projection of each blade 25 over a longitudinal plane bisecting the angle $\theta$, must be defined by a constant length L independently of the distance r to the turbine impeller 2 symmetry axis. The intersection points of each impeller blade 25 with a cylindrical surface of ray r centered on its symmetry axis, are projected on a transversal plane according to an arch of length $\theta \cdot r$. Thus, the following relation is verified between $V_{Rot}$ (r) and $V_{HT}$:

$$V_{Rot}(r) = \frac{\theta \cdot r}{L} V_{HT} \tag{9}$$

The linear velocity of rotation $V_{Rot}$ (r) of the turbine impeller 2 at a distance r from its axis, can be defined as a function of the turbine impeller 2 rotation frequency $F_{HT}$ by:

$$V_{Rot}(r) = \omega_{HT} \cdot r = 2\pi F_{HT} \cdot r \tag{10}$$

According to the preceding two expressions, the turbine impeller 2 rotation frequency $F_{HT}$ may be obtained as a function of the velocity $V_{HT}$ by which the water transverses the impeller 2 and implicitly according to expression 4 as a function of the stream velocity $V_C$ by the following expression:

$$F_{HT} = \frac{\theta}{2\pi L} V_{HT} \approx \frac{\theta}{2\pi L} \cdot K_D^2 \cdot V_C \tag{11}$$

As it may be verified the rotation frequency of the turbine impeller 2 is ideally directly proportional to the velocity $V_{HT}$ by which the water flows through the turbine impeller 2 (and so implicitly to the stream velocity $V_C$), decreasing with the number of blades and with their length L. Thus, the values of L and $\theta$ should be such that would allow an ease drag of turbine impeller 2 in and a specific rotation frequency $F_{HT}$ of the turbine impeller 2 without offering great resistance to the water flow through it.

A impeller 7 with blades, $\theta=40°$, R=0.5 m and L=0.35 m, from which results according to expression 1, $\alpha(R)=45.66°$, satisfies perfectly to all the requirements imposed on claims for the characteristics of the turbine impeller 2. Such values are going to be taken as reference values in the following calculations. The graphic on FIG. 25, shows the ideal characteristic curbs of $F_{HT}$ ($V_C$) for values of $K_D$ equal to 2, 2.5 and 3.

The power derived from the kinetic energy of the mass of water flowing through the turbine impeller 2 per unit of time, may on a punctual case for which it is considered the water flowing through the turbine impeller 2 with a constant velocity ($V_{HT}=C^{te}$), be expressed by:

$$P_{HT} = \frac{\partial E_c}{\partial t} \bigg| V_{HT} = Cte = \frac{1}{2} \frac{\partial m}{\partial t} V_{HT}^2 = \frac{1}{2} \mu V_{HT}^2 \tag{12}$$

where $\mu$ represents the quantity of water mass that flows through the turbine impeller 2 in average per unit of time. Having in consideration that the water density is approximately $\rho=1$ kg/dm³=1 kg/l, it comes:

$$P_{HT} = \frac{1}{2} Q_{HT} V_{HT}^2 \tag{13}$$

where $Q_{HT}$ represents the flow of water that transverses the turbine impeller 2, given by:

$$Q_{HT} = S_{HT} \cdot V_{HT} = \pi \cdot \frac{d_{HT}^2}{4} \cdot V_{HT} \tag{14}$$

It results then from expressions 4, 13 and 14 that:

$$P_{HT}[kW] = \frac{\pi}{8} \cdot d_{HT}[m]^2 \cdot K_D^6 \cdot V_C[m \cdot s^{-1}]^3 \tag{15}$$

having in attention that:

$1[m^2 \cdot m^3 \cdot s^{-3}] = 1[m^2 \cdot 1000 kg_{water} \cdot s^{-3}] = 1000[m^2 \cdot kg \cdot s^{-3}] = 1000W = 1kW$ This on an ideal case for which the energy loses due to friction at the conduit entrance chamber edges are not considered. Representing $\gamma_m$ the resultant of mechanic loses: by energy dispersion due to friction at the conduit entrance chamber edges, at the turbine impeller 2 and due to friction on transmission devices; the mechanic power $P_m$ transmitted to the generator shaft is given by:

$$P_m = \gamma_m \cdot P_{HT} \tag{16}$$

Figure 26:
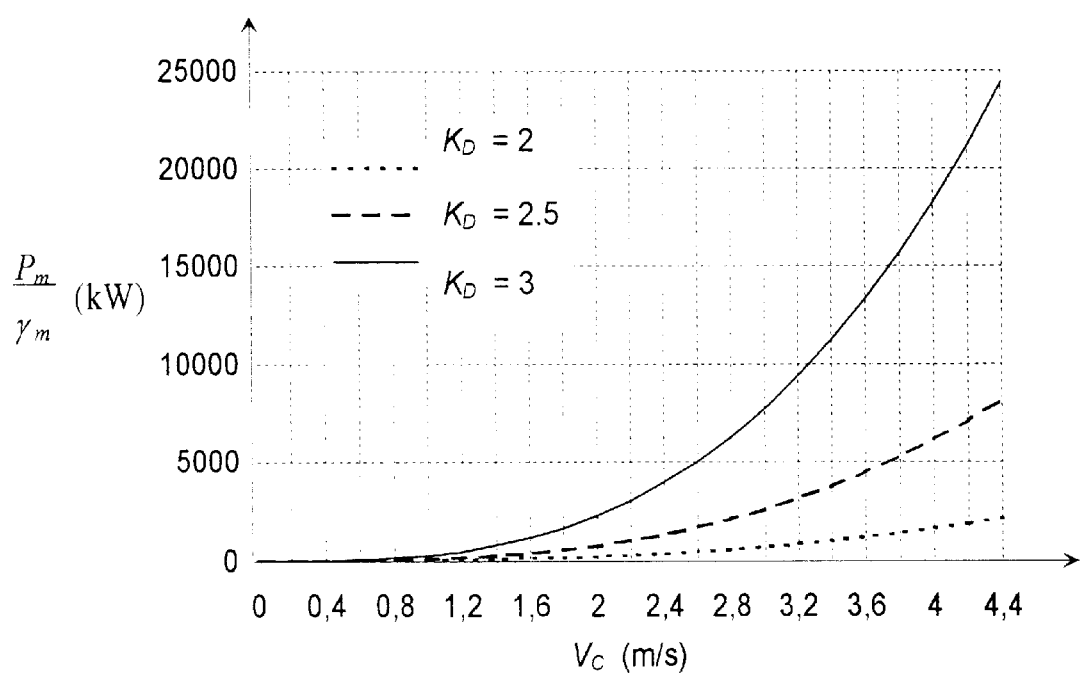
FIG. 26 shows a graphic representing the mechanic power ideally transmitted to the generator shaft against the stream velocity.

The graphic of FIG. 26 shows the characteristic curves of $P_{HT}(V_C)$ for values of $K_D$ equal to 2, 2.5 and 3.

The internal power $P_i$ of an asynchronous generator in the operating state as a generator (power transmitted from the rotor to the stator discounting the electrical loses from the Joule effect on the rotor coils) is given as a function of the mechanical power $P_m$ applied to the generator shaft by:

$$P_i = \frac{P_m}{(1-S)} \tag{17}$$

where $$S = 1 - \frac{\Omega}{\omega_E} \cdot N_P \tag{18}$$

defines the sliding factor of the rotor angular velocity $\Omega = 2\pi N_{CV} F_{HT}$ (being $N_{CV}$ the gearbox multiplication factor) with respect to the angular frequency of the stator electrical rotating field $\omega_E = 2\pi F_E$ (which corresponds to the frequency of the electrical field in the electricity distribution network). The operating state as a generator happens for negative sliding factor values.

$$P_i = \frac{\omega_E}{\Omega \cdot N_P} P_m = \frac{F_E}{N_P \cdot N_{CV} \cdot F_{HT}} P_m \tag{19}$$

From expressions 4, 11 and 17 comes:

$$P_i = \gamma_m \cdot \phi \cdot V_C^2 \text{ where } \phi = \frac{\pi^2}{4} \cdot \frac{d_{HT}^2 \cdot L}{\theta} \cdot \frac{K_D^4}{N_{CV} \cdot N_P} \cdot F_E \tag{20}$$

The electric power provided to the electricity mains can be estimated discounting from $P_i$ the electrical loses by the Joule effect at the stator conductors. The graphic of FIG. 27 shows the characteristic curves of $P_i$ ($V_C$) for values of $K_D$ equal to 2, 2.5 and 3; considering as an example the product between the multiplication factor of the gearbox and the number poles per coil $N_{CV} \cdot N_P = 30$.

As it may be verified that electrical power provided to the electricity mains, depends for a specific stream velocity: from the turbine impeller 2 format and dimensions (not forgetting the requirements imposed on the claims with relation to its characteristics), from the conduit dimensions relatively to the turbine impeller 2 and from the product between the multiplication factor of the gearbox 7 and the number of poles per coil. Whatever higher will be the multiplication factor of the gearbox 7 and the number of poles per coil, lower will be the generated power but on the other hand higher will be the time percentage during which there is electricity production. Higher will also be the difficulty to overcome the inertia momentum of the rotor. As higher will be the number of poles per coil, lower has to be the multiplication factor of the gearbox 7 for the same effect in terms of quantity of electrical power produced decreasing by this the difficulty in overcoming the rotor inertia momentum.

Figure 27:
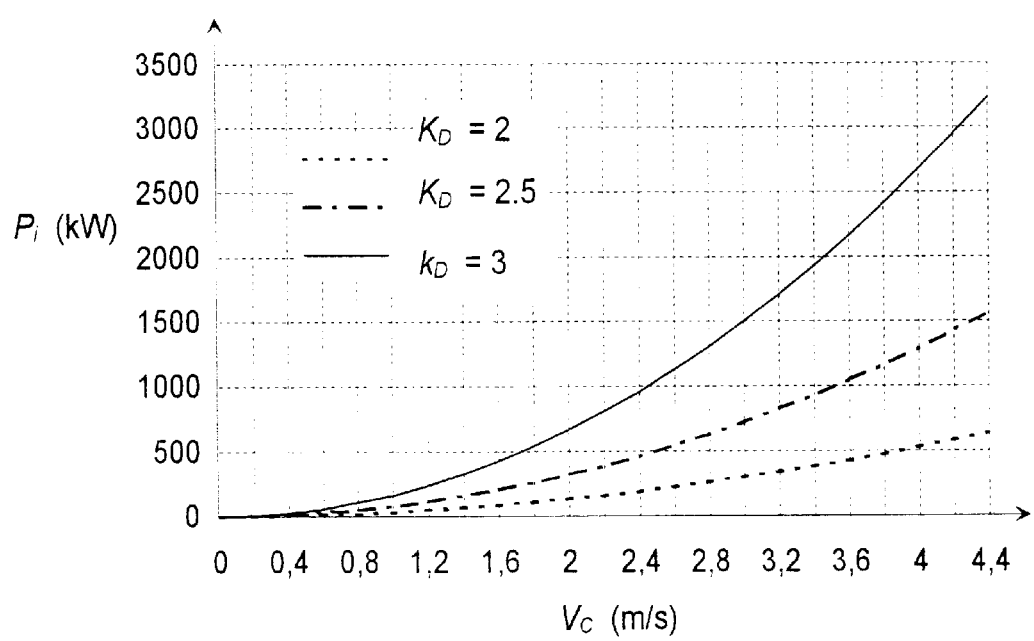
FIG. 27 shows a graphic representing the electrical power ideally provided to the mains against the stream velocity.

For a more precise interpretation of the graphics from FIGS. 25, 26 and 27, bellow is presented a table with the numeric values calculated for $F_{HT}$, $P_{HT}$ and $P_i$ as functions of $V_C$.

3, was respectively 1.3125 ms$^{-1}$, 0.84 ms$^{-1}$ and 0.583(3) ms$^{-1}$, what is in conformity with the evolution of the mechanical and electrical power values presented in Table 1.

As it was above mentioned, the centrifugal clutch and stator coils should remain disconnected for stream velocities below this threshold. The graphic of FIG. 27 relative to the production electrical power, is then comprised by an inactivity area "OFF" for stream velocities below the mentioned threshold and an activity area "ON" for stream velocities above that threshold.

I claim:

1. Hydroreactor that takes advantage of hydraulic resources, comprising a conduit (1), inside which the water flows, a turbine impeller (2), a conduit support for said conduit (1), a rudder (17), a balancing weight (18), a bearing pedestal (22), a generator (8), coupled to said turbine impeller by means of a transmission device (5, 6), a gearbox (7), and a centrifugal clutch, characterised in that the turbine impeller (2) is placed inside the said conduit (1) in which the water flows, the conduit support is comprised by a fixed part (15) well fitted over said bearing pedestal (22) solidary with four or more equally spaced hydraulic jacks (20) to lift the structure for maintenance proposes or depth control and a mobile part (16), having a main body (16') which supports directly the conduit (1), the said rudder (17) to drive the mobile part (16) according to the stream direction, and the

TABLE 1

Numerical values of $F_{HT}$, $P_{HT}$ and $P_i$ as functions of $V_C$

| $V_C$ (m/s) | $K_D = 2$ | | | $K_D = 2.5$ | | | $K_D = 3$ | | |
|---|---|---|---|---|---|---|---|---|---|
| | $F_{HT}$ (Hz) | $P_{HT}$ (kW) | $P_i$ (kW) | $F_{HT}$ (Hz) | $P_{HT}$ (kW) | $P_i$ (kW) | $F_{HT}$ (Hz) | $P_{HT}$ (kW) | $P_i$ (kW) |
| 0 | 0 | 0 | 0 | 0 | 0 | 0 | 0 | 0 | 0 |
| 0.2 | 0.254 | 0.201 | 1.319 | 0.397 | 0.767 | 3.221 | 0.571 | 2.290 | 6.680 |
| 0.4 | 0.508 | 1.608 | 5.278 | 0.794 | 6.136 | 12.885 | 1.143 | 18.322 | 26.719 |
| 0.6 | 0.762 | 5.429 | 11.875 | 1.190 | 20.709 | 28.992 | 1.714 | 91.836 | 60.118 |
| 0.8 | 1.016 | 12.868 | 21.112 | 1.587 | 49.088 | 51.542 | 2.286 | 146.575 | 106.877 |
| 1 | 1.270 | 25.133 | 32.987 | 1.984 | 95.874 | 80.534 | 2.857 | 286.278 | 166.996 |
| 1.2 | 1.524 | 43.43 | 47.501 | 2.381 | 165.670 | 115.969 | 3.429 | 494.689 | 240.474 |
| 1.4 | 1.778 | 68.964 | 64.654 | 2.778 | 263.078 | 157.847 | 4 | 785.548 | 327.312 |
| 1.6 | 2.032 | 102.944 | 84.446 | 3.175 | 392.7 | 206.168 | 4.571 | 1172.596 | 427.509 |
| 1.8 | 2.286 | 146.575 | 106.877 | 3.571 | 559.137 | 260.131 | 5.143 | 1669.575 | 541.066 |
| 2 | 2.540 | 201.062 | 131.947 | 3.968 | 766.992 | 322.137 | 5.714 | 2290.226 | 667.983 |
| 2.2 | 2.794 | 267.614 | 159.656 | 4.365 | 1020.867 | 389.785 | 6.286 | 3048.291 | 808.259 |
| 2.4 | 3.048 | 347.436 | 190.004 | 4.762 | 1325.363 | 463.877 | 6.857 | 3957.511 | 961.895 |
| 2.6 | 3.302 | 441.734 | 222.991 | 5.159 | 1685.082 | 544.411 | 7.429 | 5031.627 | 1128.891 |
| 2.8 | 3.556 | 551.715 | 258.617 | 5.556 | 2104.627 | 631.388 | 8 | 6284.381 | 1309.891 |
| 3 | 3.810 | 678.586 | 269.881 | 5.952 | 2588.599 | 724.808 | 8.571 | 7729.514 | 1502.961 |
| 3.2 | 4.063 | 823.552 | 337.785 | 6.349 | 3141.6 | 824.67 | 9.143 | 9380.767 | 1710.036 |
| 3.4 | 4.317 | 987.820 | 381.329 | 6.746 | 3768.233 | 930.975 | 9.714 | 11251.88 | 1930.47 |
| 3.6 | 4.571 | 1172.596 | 427.51 | 7.143 | 4473.098 | 1043.723 | 10.286 | 13356.6 | 2164.264 |
| 3.8 | 4.825 | 1379.087 | 476.329 | 7.540 | 5260.799 | 1162.914 | 10.857 | 15708.66 | 2411.931 |
| 4 | 5.079 | 1608.499 | 527.789 | 7.937 | 6135.938 | 1288.547 | 11.429 | 18321.81 | 2671.931 |
| 4.2 | 5.333 | 1862.039 | 581.887 | 8.333 | 7103.115 | 1420.623 | 12 | 21209.79 | 2945.804 |
| 4.4 | 5.587 | 2140.912 | 638.624 | 8.730 | 8166.933 | 1559.142 | 12.571 | 24386.33 | 3233.036 |

As it can be verified from the obtained results for stream velocities lower than a certain value, the electric power is higher than the mechanic power which means that there is a consume of electric power from the electricity mains (operating state as a motor) and for stream velocities higher than that value, the electric power is lower than the mechanical power which means the provision of electric power to the electricity mains (operating state as a generator). The stream velocity threshold under which there is consume of electric power (motor) and above which there is provision of electric power (generator), can be estimated from expression 11, making $F_{HT} = F_E I(N_{CV} \cdot N_P)$. Thus, the obtained stream velocity $V_C$ threshold value, considering $K_D$ equal to 2, 2.5 and said balancing weight (18) to match the centre of mass of the mobile structure with the axis of the bearing pedestal (22), which together, define a system of supported immersed conduit for taking advantage of the stream, with a special shape, that will promote compression at the entry side and a suction effect by depression at exit side, easing the water flow through said conduit (1), the velocity through the turbine impeller (2) being higher than the velocity of the outside stream before the conduit entrance (10), with autonomous rotation making it usable not only in rivers but also in estuaries or inlets, where the stream direction changes due to the tidal effect.

2. Hydroreactor according to the claim 1, characterised in that the external surface of the conduit (1) is defined by circular transversal sections along it.

3. Hydroreactor according to the claim 2, characterised in that the conduit external diameter varies slightly from its maximum diameter section, where the turbine impeller (2) is located, to its exit section, such as the angle $\epsilon$ defined between the axis of the conduit (1) and the line which approaches by linear regression to its external surface variation in this area, should not be higher than 10 degrees, in order to avoid as much as possible turbulence nearby this surface caused by the cavitation effect due to the stream action.

4. Hydroreactor according to the claims 2 and 3, characterised in that the internal area of the conduit (1) is defined by circular transversal sections along it, with exception to the location area of the support (3) of the turbine impeller (2).

5. Hydroreactor according to any one of the claims 2 to 4, characterised in that the transversal section useful for the water flow should be constant between the entrance chamber (10) and the vacuum chamber (11), in order to have a water motion in its interior as regular as possible.

6. Hydroreactor according to any one of the claims 2 to 5, characterised in that the length of the water flow from the end sharp edge of impeller support (3) to the vacuum chamber (11), in the internal area of the conduit (1) having a constant diameter, is approximately equal or slightly higher than the overall length of the turbine impeller (2) with its support (3), in order to attenuate completely the turbulence generated in the vacuum chamber (11), avoiding its diffusion to the edge of the impeller support (3) and on the other hand generating sufficient vacuum to compensate the charge losses inside the referenced area.

7. Hydroreactor according to any one of the claims 2 to 6, characterised in that the vacuum chamber (11) have a capacity greater than the entrance chamber (10), such that a suction effect is easily generated by the stream action at the exit of the conduit (1) causing the water to flow through the inside of the conduit (1).

8. Hydroreactor according to any one of the claims 2 to 7, characterised in that the internal diameter of the conduit (1) increases slightly in the area of the vacuum chamber (11) up to the conduit exit section, extending first through an area of lower diameter, where this variation is very slight, then though an intermediate area of maximum variation and at last through an area nearby the conduit exit section where the variation is almost null.

9. Hydroreactor according to any one of the claims 2 to 8, characterised in that the ratio between entrance section diameter of the conduit (1) and the internal diameter of the conduit (1) at the location area of the turbine impeller (2), is between 2 and 3, in order to be noticeable the difference between the stream velocity and the velocity of the water flowing through the turbine impeller (2) and on the other hand to avoid the water from blocking the conduit entrance caused by an abrupt increase of the pressure due to an exaggerate funnelling of the entrance chamber (10).

10. Hydroreactor according to any one of the claims 2 to 9, characterised in that the edges of the conduit (1) at the area of the entrance chamber (10), this is from the its entrance section to the location section of the turbine impeller (2), have a symmetrical geometry according to a semi-elliptic shape.

11. Hydroreactor according to any one of the preceding claims, characterised in that the impeller support (3) presents an inverted L shape, being as thin as possible, but having a sufficient width to enclose and allow the shielding of the shaft, associated bearings, pinions (5 and 6) and drive chain, with a limb (vertical portion of the inverted L) that ends in a rear sharp edge, in order to minimise the turbulence and presents a semi-elliptic frontal edge surface for water ripping.

12. Hydroreactor according to the claim 11, characterised in that the transmission ratio between the two first pinions (5 and 6) is 1, in order to minimise the diameter of the drive pinion (5) and with that the thickness of the impeller support (3) in its location area.

13. Hydroreactor according to any one of the preceding claims, characterised in that at the side edge of the conduit (1) below the impeller support (3), is a room for housing an asynchronous generator (8), a centrifugal clutch and one gearbox (7).

14. Hydroreactor according to the claim 13, characterised in that at the side edge of the conduit (1) is a masked door that assures reliable isolation from outside when closed, for accessing the generator room whenever maintenance is requested.

15. Hydroreactor according to any one the preceding claims, characterised in that connecting rods (12 and 13) linking the conduit (1) to the main body (16') of the support mobile part (16), have semi-elliptic frontal edge for water ripping and ending in a sharp edge in order to minimise the turbulence.

16. Hydroreactor according to the claim 15, characterised in that the connecting rods (12 and 13) linking the conduit (1) to the main body (16') of the support mobile part (16), have enough length to allow a free water flow between those two parts.

17. Hydroreactor according to any one of the preceding claims, characterised in that the external surface of the support mobile part (16) is symmetrical to the plan defined by the axis of the bearing pedestal (22) and the axis of the conduit (1).

18. Hydroreactor according to the claim 17, characterised in that the external surface of the main body (16') of the support mobile part (16) is symmetric with relation to the rudder (17) direction and defines a round edge in the opposite side to the rudder (17) for easy water ripping and ending with a sharp edge at the side of the rudder (17) in order to minimise the turbulence.

19. Hydroreactor according to the claims 17 and 18, characterised in that the main body (16') of the support mobile part (16) contains a cavity defined by the recess between two cylindrical surfaces of different diameters their axis being aligned with the axis of the bearing pedestal (22) fitting in the conduit support fixed part (15).

20. Hydroreactor according to any one of the preceding claims 17 to 19, characterised in that the main body (16') of support mobile part (16) comprises an internal cylindrical shaped cavity its axis being aligned with the axis of the bearing pedestal (22), the cavity being properly sealed from the outside against humidity.

21. Hydroreactor according to any one of the preceding claims, characterised in that comprises a rudder (17) aligned with the conduit axis, having a surface big enough to easily overcame the inertia momentum of the mobile part of the structure, keeping it oriented according to the stream direction.

22. Hydroreactor according to the claim 21, characterised in that comprises a rudder (17) that is placed far enough from the exit section of the conduit (1) in order to minimise the turbulence effect nearby the exit section of the conduit (1) in the stability of the mobile part of the structure.

23. Hydroreactor according to any of the preceding claims, characterised in that the mass of the balancing weight (18) is such that the structure mass centre matches with the axis of the bearing pedestal (22).

24. Hydroreactor according to the claim 23, characterised in that the balancing weight (18) forms half an arch defined by an elliptic section not to large in order to make it inert to the undulating effects and of narrow thickness in order to rip the water with relative ease.

25. Hydroreactor according to the preceding claims, characterised in that the fixed part (15) of the conduit support forms a circular edge, defined by the space between two cylindrical surfaces of different diameters, having their axis aligned with the axis of the bearing pedestal (22), said surfaces fitting in an adjusted way in the said cavity of the said support mobile part (16).

26. Hydroreactor according to the claim 25, characterised in that on the edge top of the support fixed part (15) there is track provided with balls forming a giant ball bearing (14) in order minimise the friction between the support fixed part (15) and the support mobile part (16).

27. Hydroreactor according to the claims 25 and 26, characterised in that the external edges at the top of the support fixed part (15) are rounded.

28. Hydroreactor according to any one of the claims 25 to 27, characterised in that on the floor inside of the support fixed part (15) a specific number of circular rails are provided (according to the number electrical phases), with an highly isolating material, where is established the contact between conducting metal brushes (24), constituting the ends of the cables (9) at the mobile part, and conducting metal rings (23), constituting the ends of the cables (9) at the fixed part.

29. Hydroreactor according to any one the preceding claims, characterised in that rotary rubber seals (26) are provided in the contact surface between the support fixed part (15) and the support mobile part (16) assuring an extreme liability isolation, preventing the entrance of any humidity to the said internal area of the support fixed part (15), where the electric contacts are established.

30. Hydroreactor according to any one of the preceding claims, characterised in that the internal face of the cavity edge of the bearing pedestal (22) defines an obtuse angle between 120° and 135°, presenting higher strength to resist to the stream traction effect.

31. Hydroreactor according to the claim 30, characterised in that the support fixed part (15) presents at its lower surface, lying on the bearing pedestal (22), a conical shaped that should be fitted in an adjusted way in the said cavity of the bearing pedestal (22).

32. Hydroreactor according to the claims 30 and 31, characterised in that the cavity surface of the bearing pedestal (22) is provide with a metal film, thus avoiding the fixed part (15) of the conduit support to be seated directly on the cement of the bearing pedestal (22).

33. Hydroreactor according to any one of the claims 25 to 29, characterised in that the support fixed part (15) is fitted with four or more equally spaced hydraulic jacks (21), to lift the structure for maintenance proposes and for controlling of the conduit depth.

34. Hydroreactor according to any one of the claims 30 to 33, characterised in that the bearing pedestal (22) is provided with holes dressed with metallic cylindrical jackets (19) for protection and adjustment proposes, where the hydraulic jacks pipes are fitted.

35. Hydroreactor according to any one of the preceding claims, characterised in that the projections of the impeller blades (25) over their bisector plane, is defined by a constant length L independently to the considered distance r from the axis of the turbine impeller (2).

36. Hydroreactor according to the claim 35, characterised in that the impeller blades (25) defining an incidence angle α(r) into the water are given as a function of the distance r to the axis of the turbine impeller (2) by the following equation:

$$\alpha(r) = \text{arctg}\left[\frac{L}{2r\sin(\theta/2)}\right]$$

where L represents the projection length of the blades (25) over their bisector plane and θ the angle between the projections of the two edges of each blade on a plane perpendicular to the axis of the turbine impeller (2).

37. Hydroreactor according to the claims 35 and 36, characterised in that the turbine impeller blades (25) define on all front edge points an incidence angle not less than 45°, in order decrease the resistance to the water flow through it.

38. Hydroreactor according to any one of the claims 35 to 37, characterised in that the blades (25) of the turbine impeller (2), do not overlap, being defined a small interval between the projections of the delimitation lines of adjacent blades (25) over a plane perpendicular to the propeller axis, in order to ease the water flow through it, the said interval not being too big in order to not imply a significant lose of power.

39. Hydroreactor according to any one of the claims 35 to 38, characterised in that the turbine impeller (2) with a number of blades (25) from 6 to 8, in order neither having very large blades (25) offering a greater resistance to the water flow nor having very narrow blades implying a significant lose of power.

40. Hydroreactor according to any one of the claims 35 to 39, characterised in that the impeller blades (25) present on front edges an half-round profile (24) in order to ease incidence into water.

41. Hydroreactor according to any one of the claims 35 to 40, characterised in that the frontal part of the impeller hub (23) is rounded shaped to ease water ripping.

42. Hydroreactor according to any one of the claims 35 to 41, characterised in that the blades (25) are connected to the hub (23) of the turbine impeller (2) only by a thin member in the continuity of the incidence half-round edge (24), resulting in an aperture around the impeller hub (23), close to which the blades (25) present an higher incidence angle, easing the reaction of the turbine impeller (2) to the water flow.

43. Hydroreactor according to any one of the claims 35 to 42, characterised in that the lower edge of the impeller blades (25), where they present an higher incidence angle, must be almost rectilinear to optimise the drag on and the reaction of the turbine impeller (2) to water flow, and ending according to a curved line in the liberation area and in the peripherical area (farthest area from the impeller (2) axis where the incidence angle is smaller) to minimise turbulence and to ease the reaction to the water flow.

44. Hydroreactor according to claims 11, 41 and 42, characterised in that the diameter of the impeller hub (23) must be equal to the diameter of the horizontal segment of the impeller support (3), in order these two elements to have contiguous surfaces so minimising the water flow irregularities.

* * * * *

UNITED STATES PATENT AND TRADEMARK OFFICE
CERTIFICATE OF CORRECTION

PATENT NO. : 6,013,955

DATED : January 11, 2000

INVENTOR(S) : António José A. dos Santos Costa

It is certified that error appears in the above-identified patent and that said Letters Patent is hereby corrected as shown below:

On the cover page, in the title, line [54] after "Production" insert --OF--.

Signed and Sealed this

Twenty-eighth Day of November, 2000

Attest:

Q. TODD DICKINSON

Attesting Officer     *Director of Patents and Trademarks*

UNITED STATES PATENT AND TRADEMARK OFFICE
CERTIFICATE OF CORRECTION

PATENT NO. : 6,013,955           Page 1 of 1
DATED    : January 11, 2000
INVENTOR(S) : António José A. dos Santos Costa It is certified that error appears in the above-identified patent and that said Letters Patent is hereby corrected as shown below:

Title page,
Line [73] please delete "Assignee: A.G. de Cunha Ferreira, Lda., Lisbon Portugal."

Signed and Sealed this

Seventeenth Day of July, 2001

Attest:

Attesting Officer

NICHOLAS P. GODICI
Acting Director of the United States Patent and Trademark Office